(12) United States Patent
Kawamura

(10) Patent No.: US 9,013,806 B2
(45) Date of Patent: Apr. 21, 2015

(54) IMAGING LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/317,850

(22) Filed: Jun. 27, 2014

(65) Prior Publication Data
US 2014/0307333 A1 Oct. 16, 2014

Related U.S. Application Data

(63) Continuation of application No. PCT/JP2012/008260, filed on Dec. 25, 2012.

(30) Foreign Application Priority Data

Dec. 27, 2011 (JP) .................................. 2011-284632

(51) Int. Cl.
G02B 13/00 (2006.01)

(52) U.S. Cl.
CPC .......... *G02B 13/002* (2013.01); *G02B 13/0045* (2013.01); *G02B 13/0015* (2013.01)

(58) Field of Classification Search
CPC ........... G02B 13/0045; G02B 13/0015; G02B 13/002
See application file for complete search history.

(56) References Cited

U.S. PATENT DOCUMENTS

| | | | |
|---|---|---|---|
| 4,223,982 A | 9/1980 | Sugiyama | |
| 2007/0201139 A1 | 8/2007 | Lin | |
| 2008/0297917 A1 | 12/2008 | Yoshitsugu et al. | |
| 2009/0226159 A1 | 9/2009 | Sensui | |
| 2010/0201782 A1 | 8/2010 | Yamada et al. | |

(Continued)

FOREIGN PATENT DOCUMENTS

| | | |
|---|---|---|
| JP | 45-25834 | 8/1970 |
| JP | 54-99429 | 8/1979 |

(Continued)

OTHER PUBLICATIONS

International Search Report, PCT/JP2012/008260, May 7, 2013.

*Primary Examiner* — David N Spector
(74) *Attorney, Agent, or Firm* — Young & Thompson

(57) ABSTRACT

An imaging-lens substantially consists of a first-lens-group, a stop and a second-lens-group in this order from object-side. The first-lens-group substantially consists of three or less lenses including a negative-lens arranged closest to object-side and a positive-lens arranged on image-side of the negative-lens. The first-lens-group includes a negative-lens having a meniscus-shape with its convex-surface facing object-side and a positive-lens cemented on the negative-lens in this order from object-side. The second-lens-group substantially consists of five or less lenses including a cemented-lens of two lenses of a positive-lens and a negative-lens and a single-lens having positive-refractive-power, and which is arranged on image-side of the cemented-lens. Conditional-formulas about a refractive-index and an Abbe-number of the negative-lens arranged closest to the object-side in the first-lens-group for d-line, Abbe-numbers of the positive-lens and the negative-lens constituting the cemented-lens in the second-lens-group for d-line, and a refractive-index of the single-lens constituting the second-lens-group for d-line are satisfied.

16 Claims, 12 Drawing Sheets

EXAMPLE 1

(56) References Cited

U.S. PATENT DOCUMENTS

2012/0170135 A1    7/2012   Oshita
2012/0176529 A1    7/2012   Matsuo et al.

FOREIGN PATENT DOCUMENTS

| | | |
|---|---|---|
| JP | 2007-226195 | 9/2007 |
| JP | 2008-298899 | 12/2008 |
| JP | 2009-237542 | 10/2009 |
| JP | 2009-258157 | 11/2009 |
| JP | 2009-300919 | 12/2009 |
| JP | 2010-186011 | 8/2010 |
| JP | 2011-059288 | 3/2011 |
| JP | 2011-059598 | 3/2011 |
| WO | EP 2 799 923 A1 * | 11/2014 |

* cited by examiner

EXAMPLE 2

EXAMPLE 4

EXAMPLE 5

EXAMPLE 6

EXAMPLE 7

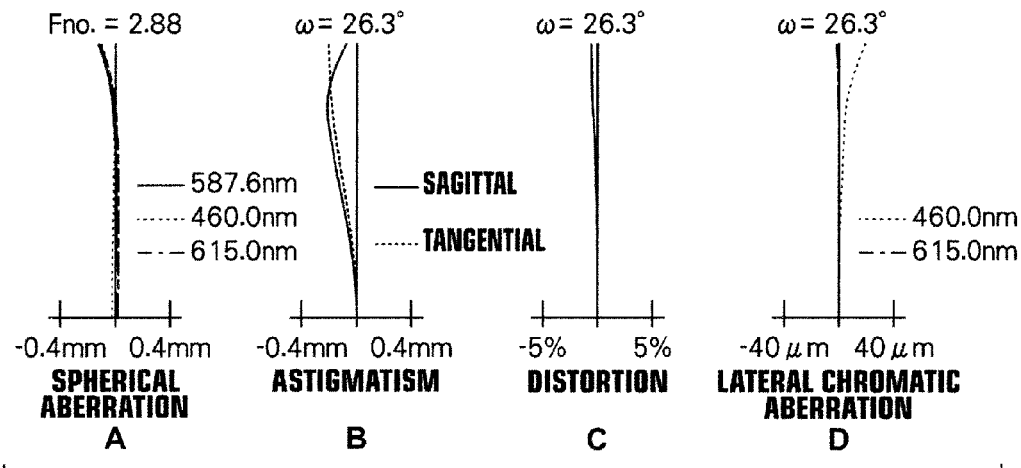
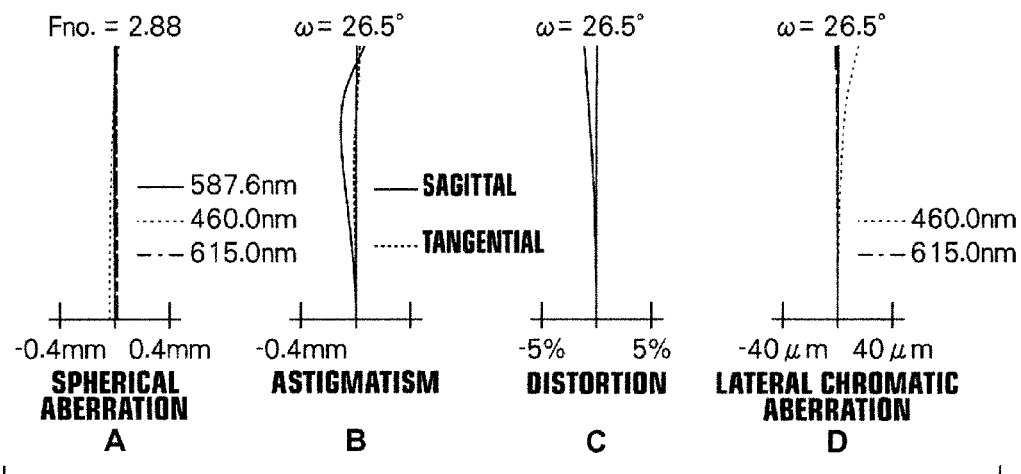

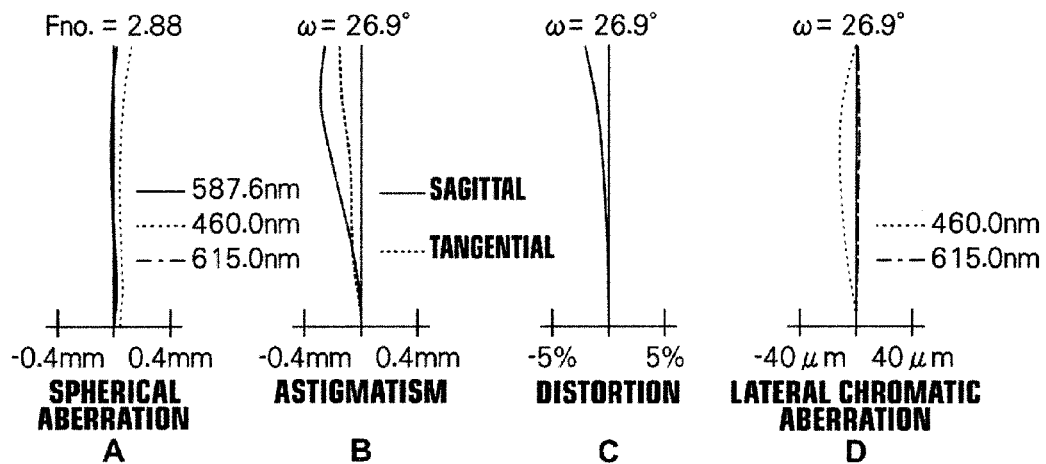
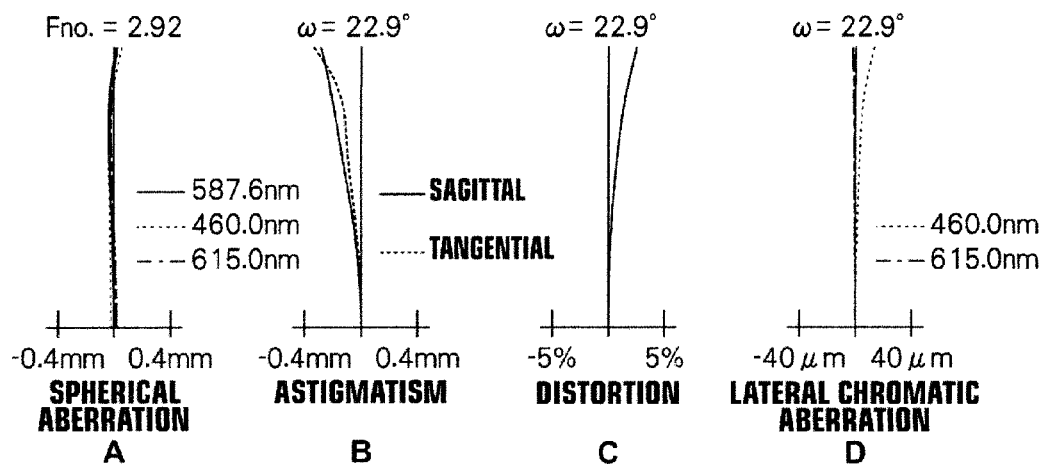

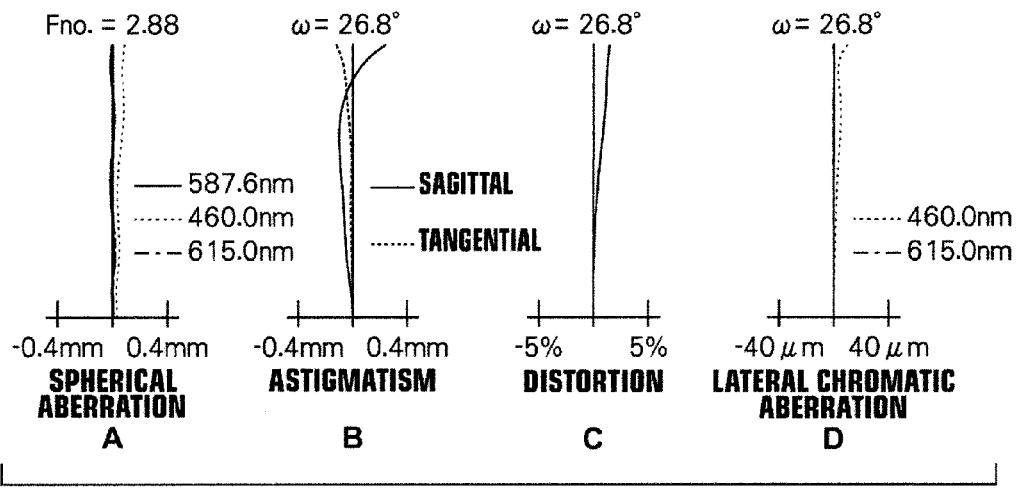
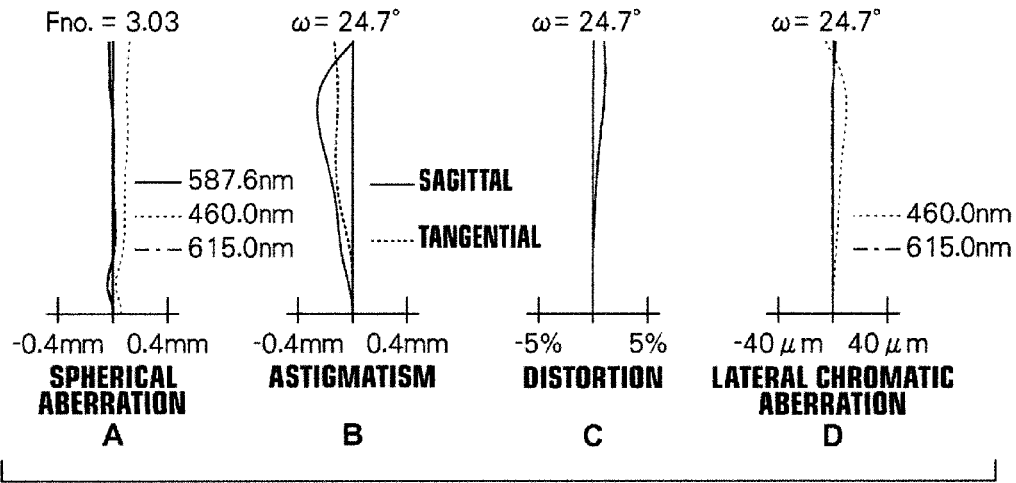

EXAMPLE 7

IMAGING LENS AND IMAGING APPARATUS

CROSS-REFERENCE TO RELATED APPLICATIONS

This application is a Continuation of PCT International Application No. PCT/JP2012/008260 filed on Dec. 25, 2012, which claims priority under 35 U.S.C. §119(a) to Japanese Patent Application No. 2011-284632 filed on Dec. 27, 2011. Each of the above applications is hereby expressly incorporated by reference, in its entirety, into the present application.

BACKGROUND OF THE INVENTION

1. Field of the Invention

The present invention relates to an imaging lens, and particularly to a small-size lens appropriate for an imaging apparatus, such as an electronic camera. Further, the present invention relates to an imaging apparatus including such an imaging lens.

2. Description of the Related Art

In recent years, many digital cameras with large-size imaging devices for example by APS format, Four Thirds format or the like mounted therein were provided for the market. Recently, not only digital single-lens reflex cameras but also lens-interchangeable digital cameras without reflex finders and compact cameras using the large-size imaging devices became provided. The advantage of these cameras is their excellent portability because of the small size of the entire system while achieving high image qualities. As the size of the cameras has become smaller, a need for reduction in the size and the thickness of lens systems is greatly increasing.

Small-size imaging lenses composed of a small number of lenses, and which cope with such large-size imaging devices, are proposed, for example, in Japanese Unexamined Patent Publication No. 2009-237542 (Patent Document 1), Japanese Unexamined Patent Publication No. 2009-258157 (Patent Document 2), Japanese Unexamined Patent Publication No. 2010-186011 (Patent Document 3), and Japanese Unexamined Patent Publication No. 2011-059288 (Patent Document 4). In all of the imaging lenses disclosed in Patent Documents 1 through 4, a negative lens is arranged closest to an object side, and they have a lens structure with so-called retrofocus-type or similar arrangement of refractive power.

SUMMARY OF THE INVENTION

When imaging lenses are used as interchangeable lenses for cameras, especially, for single-lens reflex cameras, a long back focus is needed in some cases to insert various optical elements between a lens system and an imaging device, or to secure an optical path length for a reflex finder. In such a case, retrofocus-type arrangement of refractive power is appropriate.

Meanwhile, even in the imaging apparatuses using the aforementioned large-size imaging devices by APS format or the like, such a long back focus as required in an interchangeable lens for a single-lens reflex camera is not needed in some cases, depending on the structure of the imaging apparatus, such as a lens-interchangeable-type camera without a reflex finder or a compact camera with a built-in lens.

Here, all of the imaging lenses disclosed in Patent Documents 1 through 4 are structured in such a manner that a negative lens is arranged closest to the object side. Further, a negative lens, a positive lens and a positive lens are arranged on the image plane side of a stop. The optical total length of such type of imaging lens inevitably becomes long to secure both of a long back focus and optical performance.

When the imaging lenses disclosed in Patent Documents 1 through 4 are applied to imaging apparatuses using the aforementioned large-size imaging devices by APS format or the like, it is possible to secure high optical performance. However, it is desirable that the size of the imaging lenses is also reduced to meet the excellent portability of the imaging apparatuses, the size of which as the entire system is small.

In view of the foregoing circumstances, it is an object of the present invention to provide a thin low-cost imaging lens that suppresses an angle of incidence to an imaging device while securing optical performance for coping with a large-size imaging device, and which is formable in small size, and to provide an imaging apparatus to which the imaging lens has been applied.

An imaging lens of the present invention substantially consists of a first lens group, a stop, and a second lens group in this order from an object side.

The first lens group substantially consists of three or less lenses including a negative lens arranged closest to the object side and a positive lens arranged on an image side of the negative lens.

The second lens group substantially consists of five or less lenses including a cemented lens composed of two lenses of a positive lens and a negative lens cemented together and a single lens having positive refractive power, and which is arranged on the image side of the cemented lens.

The following conditional formulas (1) through (4) are satisfied:

$$NdfL > 1.65 \quad (1);$$

$$20 < vdfL < 40 \quad (2);$$

$$4 < vd2p - vd2n < 25 \quad (3); \text{ and}$$

$$NdrL > 1.7 \quad (4), \text{ where}$$

NdfL: a refractive index of the negative lens in the first lens group for d-line, vdfL: an Abbe number of the negative lens in the first lens group for d-line, vd2p: an Abbe number of the positive lens constituting the cemented lens in the second lens group for d-line, vd2n: an Abbe number of the negative lens constituting the cemented lens in the second lens group for d-line, and NdrL: a refractive index of the single lens constituting the second lens group for d-line.

In the cemented lens of the second lens group, either the positive lens or the negative lens may be located on the object side.

The imaging lens of the present invention substantially consists of the first lens group and the second lens group. However, lenses substantially without any refractive power, optical elements other than lenses, such as a stop and a cover glass, mechanical parts, such as a lens flange, a lens barrel, an imaging device, and a hand shake blur correction mechanism, and the like may be included in addition to the two lens groups.

Further, in the present invention, the surface shape of a lens, such as a convex surface, a concave surface, a flat surface, biconcave, meniscus, biconvex, plano-convex and plano-concave, and the sign of the refractive power of a lens, such as positive and negative, are considered in a paraxial region unless otherwise mentioned when a lens includes an aspherical surface. Further, in the present invention, the sign of a curvature radius is positive when a surface shape is convex toward an object side, and negative when a surface shape is convex toward an image side.

In the imaging lens of the present invention, it is desirable that at least one of the following conditional formulas (1-1), (2-1) and (3-1) is satisfied:

$$NdfL > 1.66 \quad (1\text{-}1);$$

$$23 < vdfL < 38 \quad (2\text{-}1); \text{ and}$$

$$6 < vd2p - vd2n < 24 \quad (3\text{-}1).$$

Further, in the imaging lens of the present invention, it is desirable that the first lens group has positive refractive power.

Further, in the imaging lens of the present invention, it is desirable that the first lens group includes a negative lens having a meniscus shape with its convex surface facing the object side and a positive lens cemented on the negative lens in this order from the object side.

In the imaging lens of the present invention, it is desirable that the following conditional formula (5) is satisfied:

$$-0.05 < Nd2p - Nd2n < 0.20 \quad (5), \text{ where}$$

Nd2p: a refractive index of the positive lens constituting the cemented lens in the second lens group for d-line, and
Nd2n: a refractive index of the negative lens constituting the cemented lens in the second lens group for d-line.

In this case, it is more desirable that the following conditional formula (5-1) is satisfied:

$$-0.03 < Nd2p - Nd2n < 0.18 \quad (5\text{-}1).$$

In the imaging lens of the present invention, it is more desirable that the following conditional formula (6) is satisfied:

$$0.05 < f/f2c < 0.90 \quad (6), \text{ where}$$

f2c: a focal length of the cemented lens in the second lens group, and
f: a focal length of an entire system.

In this case, it is more desirable that the following conditional formula (6-1) is satisfied:

$$0.08 < f/f2c < 0.85 \quad (6\text{-}1).$$

In the imaging lens of the present invention, it is desirable that the following conditional formula (7) is satisfied:

$$0 < f/f2 < 0.6 \quad (7), \text{ where}$$

f2: a focal length of the second lens group, and
f: a focal length of an entire system.

In this case, it is more desirable that the following conditional formula (7-1) is satisfied:

$$0.02 < f/f2 < 0.58 \quad (7\text{-}1).$$

In the imaging lens of the present invention, it is desirable that the following conditional formula (8) is satisfied:

$$2.2 < TL/Y < 3.2 \quad (8), \text{ where}$$

TL: a distance on an optical axis from a most-object-side lens surface in an entire system to an image plane (a back focus portion is a distance in air), and
Y: a maximum image height.

In this case, it is more desirable that the following conditional formula (8-1) is satisfied:

$$2.3 < TL/Y < 3.1 \quad (8\text{-}1).$$

Here, maximum image height Y may be determined based on the specification of lens design, the specification of an apparatus on which the lens is mounted, and the like.

In the imaging lens of the present invention, it is desirable that the second lens group includes at least one aspheric lens having at least one aspherical surface.

In this case, it is desirable that a single lens having positive refractive power, and the two surfaces of which are spherical, is arranged closest to the image side in the second lens group, and the aspheric lens is arranged on the object side of the single lens having positive refractive power.

In this case, it is desirable that all lenses in an entire system except the aspheric lens are spherical lenses.

In the imaging lens of the present invention, it is desirable that the second lens group substantially consists of four lenses of a single lens having positive refractive power, and which is arranged closest to the image side, a cemented lens composed of two lenses, and which is arranged on the object side of the single lens, and a single lens.

An imaging apparatus according to the present invention includes the imaging lens of the present invention, as described above.

The imaging lens of the present invention can correct various aberrations, such as a spherical aberration, curvature of field and chromatic aberrations, generated in the first lens group, in a well-balanced manner when the first lens group substantially consists of at least one negative lens and a positive lens. Further, since a cemented lens is provided in the second lens group, it is possible to excellently correct chromatic aberrations. Further, since a single lens having positive power is arranged on the image-plane side of the cemented lens, it is possible to suppress the exit angle of peripheral rays without making the back focus too long.

Further, since conditional formulas (1) through (4) are satisfied, it is possible to reduce the size of the imaging lens. Further, it is possible to realize an imaging lens having excellent optical performance in which excellent images are obtainable even in a peripheral portion of an image formation area by excellently correcting various aberrations.

The imaging apparatus of the present invention includes the imaging lens of the present invention. Therefore, the imaging apparatus is structurable in small size and at low cost. Further, excellent images with high resolution, and in which various aberrations have been corrected, are obtainable.

BRIEF DESCRIPTION OF THE DRAWINGS

FIG. 8, Sections A through D are aberration diagrams of the imaging lens according to Example 1 of the present invention;
FIG. 9, Sections A through D are aberration diagrams of the imaging lens according to Example 2 of the present invention;
FIG. 10, Sections A through D are aberration diagrams of the imaging lens according to Example 3 of the present invention;

FIG. 11, Sections A through D are aberration diagrams of the imaging lens according to Example 4 of the present invention;

FIG. 12, Sections A through D are aberration diagrams of the imaging lens according to Example 5 of the present invention;

FIG. 13, Sections A through D are aberration diagrams of the imaging lens according to Example 6 of the present invention;

DESCRIPTION OF THE PREFERRED EMBODIMENTS

Figure 1:
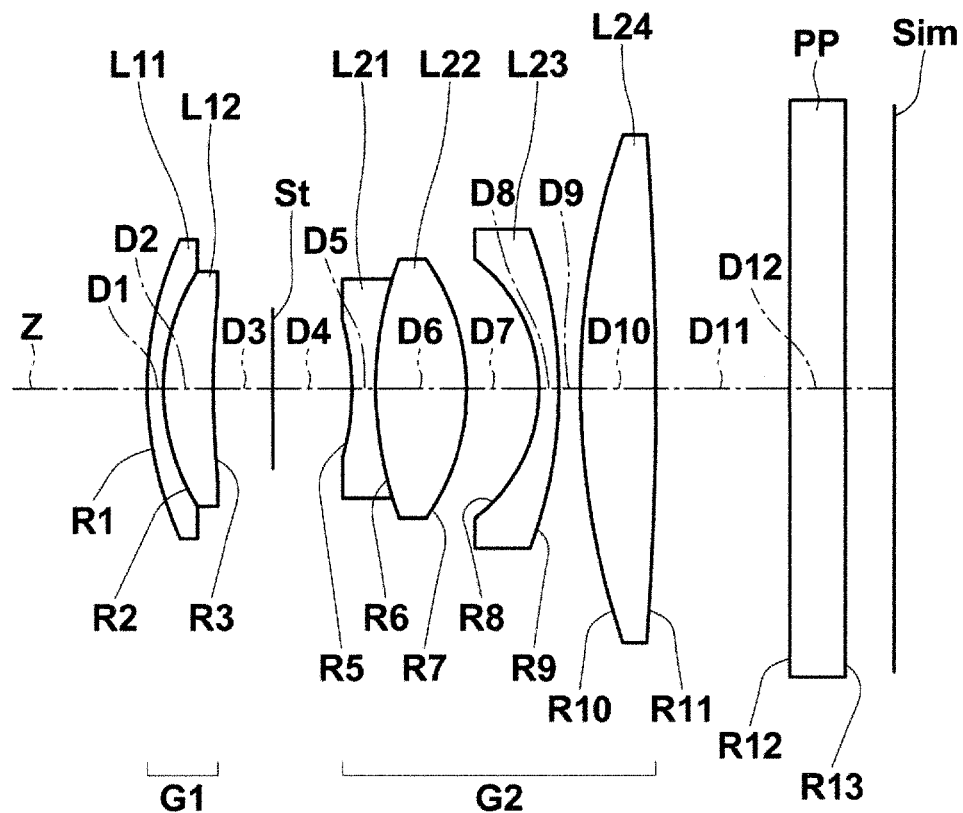
FIG. 1 is a cross section illustrating the lens structure of an imaging lens according to Example 1 of the present invention.

Hereinafter, embodiments of the present invention will be described in detail with reference to drawings. FIG. 1 is a cross section illustrating an example of the structure of an imaging lens according to an embodiment of the present invention. FIG. 1 corresponds to an imaging lens of Example 1, which will be described later. FIG. 2 through FIG. 7 are cross sections illustrating other examples of the structure of an imaging lens according to embodiments of the present invention. FIG. 2 through FIG. 7 correspond to imaging lenses of Examples 2 through 7, which will be described later, respectively. In the examples illustrated in FIG. 1 through FIG. 7, the basic structure is substantially similar to each other, and the illustration method is also similar. Therefore, the imaging lens according to the embodiments of the present invention will be described mainly with reference to FIG. 1.

In FIG. 1, the left side is the object side and the right side is the image side, and the arrangement of an optical system at infinity focus is illustrated. FIG. 2 through FIG. 7, which will be described later, are illustrated in a similar manner.

The imaging lens according to an embodiment of the present invention substantially consists of first lens group G1 and second lens group G2, as lens groups, in this order from the object side. Further, aperture stop St is arranged between first lens group G1 and second lens group G2.

First lens group G1 substantially consists of three or less lenses including a negative lens arranged closest to the object side and a positive lens arranged on an image side of the negative lens. In the embodiment of the present invention, first lens group G1 substantially consists of two lenses of 1-1st lens L11, which is a negative lens having a meniscus shape with its convex surface facing the object side, and 1-2nd lens L12, which is a positive lens cemented on 1-1st lens L11, in this order from the object side.

In Examples 2 through 4, 6 and 7, which will be described later, first lens group G1 is structured also in a similar manner. However, in Example 5, first lens group G1 substantially consists of three lenses of 1-1st lens L11, which is a negative lens having a meniscus shape with its convex surface facing the object side, 1-2nd lens L12, which is a positive lens cemented on 1-1st lens L11, and 1-3rd lens L13, which is a negative lens, in this order from the object side.

Second lens group G2 substantially consists of five or less lenses including a cemented lens composed of two lenses of a positive lens and a negative lens cemented together and a single lens having positive refractive power, and which is arranged on the image side of the cemented lens. In the embodiment of the present invention, second lens group G2 substantially consists of four lenses of 2-1st lens L21 having biconcave shape, 2-2nd lens L22 having biconvex shape, and which is cemented on 2-1st lens L21, 2-3rd lens L23, which is a negative lens having a meniscus shape with its convex surface facing the image side, and 2-4-th lens L24 having biconvex shape in this order from the object side.

In Example 2, which will be described later, second lens group G2 has similar structure. However, in Example 3, an object-side surface of 2-3rd lens L23 is an aspherical surface. Further, in Examples 4 and 7, second lens group G2 substantially consists of five lenses of 2-1st lens L21, which is a positive lens having a meniscus shape with its convex surface facing the image side, 2-2nd lens L22 having biconcave shape, 2-3rd lens L23 having biconvex shape, and which is cemented on 2-2nd lens L22, 2-4-th lens L24 with negative refractive power, and having a meniscus shape with its convex surface facing the image side, and 2-5-th lens L25 having biconvex shape in this order from the object side.

Further, in Examples 5 and 6, second lens group G2 substantially consists of four lenses of 2-1st lens L21, which is a positive lens having a meniscus shape with its convex surface facing the image side, and the object-side surface and the image-side surface of which are aspherical surfaces, 2-2nd lens L22 having biconvex shape, 2-3rd lens L23 having biconcave shape, and which is cemented on 2-2nd lens L22, and 2-4-th lens L24, which is a positive lens having a meniscus shape with its convex surface facing the object side in this order from the object side.

Further, aperture stop St, illustrated in FIG. 1, does not necessarily represent the size nor the shape of aperture stop St, but the position of aperture stop St on optical axis Z. Further, the sign of Sim, illustrated here, represents an image formation plane. An imaging device, for example, such as a CCD (Charge Coupled Device) and a CMOS (Complementary Metal Oxide Semiconductor), is arranged at this position, as will be described later.

Further, FIG. 1 illustrates an example in which parallel-flat-plate-shaped optical member PP is arranged between second lens group G2 and image formation plane Sim. When an imaging lens is applied to an imaging apparatus, a cover glass, various kinds of filter, such as an infrared ray cut filter and a low-pass filter, or the like is often arranged between an optical system and image formation plane Sim based on the structure of the imaging apparatus on which the lens is mounted. The aforementioned optical member PP assumes such elements.

In the imaging lens according to the embodiment of the present invention, focusing is performed by moving the entire optical system along optical axis Z.

The imaging lens according to the embodiment of the present invention can correct various aberrations, such as a spherical aberration, curvature of field and chromatic aberrations, generated in first lens group G1, in a well-balanced manner because first lens group G1 substantially consists of 1-1st lens L11, which is at least one negative lens, and 1-2nd lens L12, which is a positive lens. Further, since 1-1st lens L11 and 1-2nd lens L12 are cemented together, as a cemented lens, excellent achromatization is achievable.

Particularly, first lens group G1 substantially consists of a negative lens having a meniscus shape with its convex surface facing the object side and a positive lens cemented on the negative lens in this order from the object side. Therefore, it is possible to correct various aberrations, such as a spherical aberration, curvature of field and chromatic aberrations, generated in first lens group G1, in a well-balanced manner.

Further, since a cemented lens is provided in second lens group G2, it is possible to excellently correct chromatic aberrations. Further, since a single lens having positive power is arranged on the image-plane side of the cemented lens, it is possible to suppress the exit angle of peripheral rays without making the back focus too long.

The imaging lens according to the embodiment of the present invention has structure, as described above, and satisfies the following conditional formulas (1) through (4):

$$NdfL > 1.65 \quad (1);$$

$$20 < vdfL < 40 \quad (2);$$

$$4 < vd2p - vd2n < 25 \quad (3); \text{ and}$$

$$NdrL > 1.7 \quad (4), \text{ where}$$

NdfL: a refractive index of the negative lens arranged closest to the object side in first lens group G1 for d-line, vdfL: an Abbe number of the negative lens arranged closest to the object side in first lens group G1 for d-line, vd2p: an Abbe number of the positive lens constituting the cemented lens in second lens group G2 for d-line, vd2n: an Abbe number of the negative lens constituting the cemented lens in second lens group G2 for d-line, and NdrL: a refractive index of the single lens constituting second lens group G2 for d-line.

In FIG. 1, the negative lens arranged closest to the object side in first lens group G1 corresponds to 1-1st lens L11. The positive lens constituting the cemented lens in second lens group G2 corresponds to 2-2nd lens L22, and the negative lens constituting the cemented lens in second lens group G2 corresponds to 2-1st lens L21. Further, the single lens constituting second lens group G2 corresponds to 2-4-th lens L24.

Further, in the ranges defined by these conditional formulas (1) through (4), especially at least one of the following conditional formulas (1-1), (2-1) and (3-1) is satisfied:

$$NdfL > 1.66 \quad (1-1);$$

$$23 < vdfL < 38 \quad (2-1); \text{ and}$$

$$6 < vd2p - vd2n < 24 \quad (3-1).$$

Conditions defined by conditional formulas (1) through (4), in other words, specific values of the literal parts of the expressions for each example will be collectively shown in Table 11. This is similar also for conditional formulas (5) through (8), which will be described later.

When all of conditional formulas (1) through (4) are satisfied, as described above, the imaging lens according to the embodiment of the present invention can achieve the following effects. Specifically, conditional formula (1) defines a refractive index of the negative lens (1-1st lens L11 in FIG. 1) arranged closest to the object side in first lens group G1. If the value is lower than the lower limit value, it becomes difficult to correct astigmatism and a coma aberration, and that is not desirable.

Conditional formula (2) defines an Abbe number of the negative lens arranged closest to the object side in first lens group G1. If the value is not within the range defined by conditional formula (2), it becomes difficult to correct chromatic aberrations, in particular, a longitudinal chromatic aberration, and that is not desirable.

Conditional formula (3) defines a difference between the Abbe numbers of the positive lens and the negative lens (2-2nd lens L22 and 2-1st lens L21 in FIG. 1) constituting the cemented lens arranged in second lens group G2. If the value is not within the range defined by the conditional formula, it becomes difficult to correct both of a longitudinal chromatic aberration and a lateral chromatic aberration in a well-balanced manner, and that is not desirable.

Conditional formula (4) defines a refractive index of at least one single lens (2-4-th lens L24 in FIG. 1) having positive refractive power, and which is arranged in second lens group G2. The single lens is arranged on the image side of the cemented lens. If the value is lower than the lower limit value, control of Petzval sum becomes difficult, and correction of curvature of field becomes difficult.

In the imaging lens according to the embodiment of the present invention, especially when all of conditional formulas (1-1) through (3-1) are also satisfied in the ranges defined by conditional formulas (1) through (4), the aforementioned effects are more remarkably achievable. Here, it is not necessary that all of conditional formulas (1-1) through (3-1) are satisfied. When even one of them is satisfied, the aforementioned effects become more excellent.

Further, in the imaging lens according to the embodiment of the present invention, first lens group G1 has positive refractive power. Therefore, it is possible to reduce the size of the lens system.

Further, the imaging lens according to the embodiment of the present invention satisfies the following conditional formula (5). Further, in the range defined by conditional formula (5), especially the following conditional formula (5-1) is satisfied:

$$-0.05 < Nd2p - Nd2n < 0.20 \quad (5); \text{ and}$$

$$-0.03 < Nd2p - Nd2n < 0.18 \quad (5-1), \text{ where}$$

Nd2p: a refractive index of the positive lens constituting the cemented lens in second lens group G2 for d-line, and Nd2n: a refractive index of the negative lens constituting the cemented lens in second lens group G2 for d-line.

Conditional formula (5) defines a difference between the refractive indices of the positive lens and the negative lens constituting the cemented lens arranged in second lens group G2. If the value is not within the range defined by the conditional formula, it becomes difficult to correct a spherical aberration and a lateral chromatic aberration, and that is not desirable.

In the imaging lens according to the embodiment of the present invention, especially when conditional formula (5-1) is also satisfied in the range defined by conditional formula (5), the aforementioned effects are more remarkably achievable.

Further, the imaging lens according to the embodiment of the present invention satisfies the following conditional formula (6). Further, in the range defined by conditional formula (6), especially the following conditional formula (6-1) is satisfied:

$$0.05 < f/f2c < 0.90 \quad (6); \text{ and}$$

$$0.08 < f/f2c < 0.85 \quad (6-1), \text{ where}$$

f2c: a focal length of the cemented lens in second lens group G2, and f: a focal length of an entire system.

Conditional formula (6) defines a relationship between a focal length of the cemented lens arranged in second lens group G2 and a focal length of an entire system. If the value exceeds the upper limit value, correction of a lateral chromatic aberration becomes difficult, and that is not desirable.

On the other hand, if the value is lower than the lower limit value, correction of astigmatism becomes difficult, and that is not desirable.

In the imaging lens according to the embodiment of the present invention, especially when conditional formula (6-1) is also satisfied in the range defined by conditional formula (6), the aforementioned effects are more remarkably achievable.

Further, the imaging lens according to the embodiment of the present invention satisfies the following conditional formula (7). Further, in the range defined by conditional formula (7), especially the following conditional formula (7-1) is satisfied:

$$0<f/f2<0.6 \quad (7); \text{ and}$$

$$0.02<f/f2<0.58 \quad (7\text{-}1), \text{ where}$$

f2: a focal length of second lens group G2, and
f: a focal length of an entire system.

Conditional formula (7) defines a relationship between a focal length of second lens group G2 and a focal length of an entire system. If the value exceeds the upper limit value, correction of aberrations, in particular, correction of curvature of field and distortion becomes difficult, and that is not desirable. On the other hand, if the value is lower than the lower limit value, that is advantageous to correction of aberrations, but the total lens length becomes long, and that is not desirable.

In the imaging lens according to the embodiment of the present invention, especially when conditional formula (7-1) is also satisfied in the range defined by conditional formula (7), the aforementioned effects are more remarkably achievable.

Further, the imaging lens according to the embodiment of the present invention satisfies the following conditional formula (8). Further, in the range defined by conditional formula (8), especially the following conditional formula (8-1) is satisfied:

$$2.2<TL/Y<3.2 \quad (8); \text{ and}$$

$$2.3<TL/Y<3.1 \quad (8\text{-}1), \text{ where}$$

TL: a distance on an optical axis from a most-object-side lens surface in an entire system to an image plane (a back focus portion is a distance in air), and
Y: a maximum image height.

Here, maximum image height Y may be determined based on the specification of lens design, the specification of an apparatus on which the lens is mounted, and the like.

Conditional formula (8) defines a relationship between an optical total length and a maximum image height. If the value exceeds the upper limit value, that is advantageous to correction of aberrations. However, the size of the entire lens system becomes large, and that is not desirable as to the portability. On the other hand, if the value is lower than the lower limit value, correction of a spherical aberration and curvature of field in the entire lens system becomes difficult, and that is not desirable.

In the imaging lens according to the embodiment of the present invention, especially when conditional formula (8-1) is also satisfied in the range defined by conditional formula (8), the aforementioned effects are more remarkably achievable.

Further, in the imaging lens according to the embodiment of the present invention, when second lens group G2 includes at least one aspheric lens having at least one aspherical surface, it is possible to keep excellent balance between axial aberrations and off-axial aberrations, and to excellently correct curvature of field.

In this case, when a single lens having positive refractive power, and the two surfaces of which are spherical, is arranged closest to the image side in second lens group G2, it is possible to suppress the exit angle of peripheral rays without making a back focus too long. When this positive lens is located further closer to the image plane while a necessary back focus is kept, such arrangement is more advantageous to reduction in size.

If an aspherical surface is provided on a lens arranged closer to the image plane, rays passing through the lens surface and traveling toward respective image heights have been separated from each other. Therefore, the effect of the aspherical surface is easily utilizable. However, in the same type of imaging lens as the imaging lens according to the embodiment of the present invention, the diameter of a lens sharply increases toward the image plane side. Therefore, there is a problem that the cost becomes high. Especially, the imaging lens according to the embodiment of the present invention assumes use of a large-size imaging device. Therefore, the outer diameter of a last lens tends to become very large. Meanwhile, the imaging lens according to the embodiment of the present invention gives priority to reduction in thickness. Therefore, unless correction of aberrations is extremely difficult as in the case of a wide angle of view, a large diameter and the like, even if the lens is located close to stop St, the cost is reducible while a certain degree of aberration correction capability is possessed. Therefore, it is desirable that the aspherical surface is provided on a more front-side lens instead of the last lens.

In this case, it is possible to reduce the cost by adopting spherical lenses, as lenses other than the aspheric lens in the entire system.

When second lens group G2 substantially consists of four lenses of a single lens having positive refractive power, and which is arranged closest to the image side, a cemented lens composed of two lenses, and which is arranged on the object side of the single lens, and a single lens, it is possible to structure the imaging lens using a minimum number of lenses. Therefore, it is possible to reduce the thickness, the cost and the weight of the imaging lens.

Next, examples of the imaging lens of the present invention will be described, and in particular, numerical value examples will be mainly described in detail.

Example 1

FIG. 1 is a diagram illustrating the arrangement of lens groups in an imaging lens of Example 1. Since the lens groups and each lens in the structure of FIG. 1 were described in detail already, explanations will not be repeated in the following descriptions, unless especially necessary.

Table 1 shows basic lens data on the imaging lens of Example 1. Here, data including optical member PP are shown. In Table 1, column Si shows the surface number of the i-th surface (i=1, 2, 3, . . . ). The object-side surface of a composition element located closest to the object side is the first surface, and surface numbers are assigned to composition elements in such a manner to sequentially increase toward the image side. Column Ri shows the curvature radius of the i-th surface, and column Di shows a distance on optical axis Z between the i-th surface and the (i+1)th surface. Column Ndj shows the refractive index of the j-th composition element (j=1, 2, 3, . . . ) for d-line (wavelength is 587.6 nm). A composition element closest to the object side is the first composition element, and the number j sequentially increases toward the image side. Column vdj shows the Abbe number of the j-th composition element for d-line. Here, the basic lens data including aperture stop St are shown. In the column of curvature radius, the sign of ∞ (STOP) is written for a surface corresponding to aperture stop St.

In Table 1, the unit of values of curvature radius R and surface distance D is mm. In Table 1, numerical values rounded at predetermined digits are written. The sign of a curvature radius is positive when a surface shape is convex toward the object side, and negative when a surface shape is convex toward the image side. Further, focal length f of the entire lens system and FNo. are also shown at the bottom of Table 1.

The description method in Table 1, as described so far, is similar also in Tables 2, 3, 5, 6, 8 and 10, which will be described later.

In all tables that will be described hereinafter, "mm" is used as the unit of length, as described above, and degree (°) is used as the unit of angle. However, since an optical system is usable by proportionally enlarging or proportionally reducing the optical system, other appropriate units may be used.

TABLE 1

EXAMPLE 1. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 17.8764 | 0.81 | 1.688931 | 31.07 |
| 2 | 10.9986 | 2.50 | 1.882997 | 40.76 |
| 3 | 52.4303 | 1.69 | | |
| 4 | ∞(STOP) | 4.00 | | |
| 5 | −12.8644 | 1.20 | 1.922860 | 20.88 |
| 6 | 18.6800 | 4.56 | 1.903658 | 31.32 |
| 7 | −11.4424 | 3.60 | | |
| 8 | −8.2051 | 1.00 | 1.622992 | 58.16 |
| 9 | −22.7057 | 1.07 | | |
| 10 | 39.1563 | 3.80 | 1.903658 | 31.32 |
| 11 | −180.3179 | 1.69 | | |
| 12 | ∞ | 2.80 | 1.550000 | 55.00 |
| 13 | ∞ | | | | f = 28.919
FNo. = 2.88

Here, a spherical aberration, astigmatism, distortion and a lateral chromatic aberration of the imaging lens of Example 1 at infinity focus are illustrated in FIG. 8, Sections A through D, respectively. Each aberration is based on d-line (wavelength is 587.6 nm). The diagram of the spherical aberration illustrates aberrations also for the wavelengths of 460.0 nm and 615.0 nm. Especially, the diagram of the lateral chromatic aberration illustrates aberrations for the wavelengths of 460.0 nm and 615.0 nm. In the diagram of the astigmatism, an aberration for a sagittal direction is indicated by a solid line, and an aberration for a tangential direction is indicated by a broken line. In the diagram of the spherical aberration, FNo. represents F-number, and in the other diagrams, ω represents a half angle of view. The representation method of aberrations, as described so far, is similar also in FIG. 9 through FIG. 14, which will be described later.

Example 2

Figure 2:
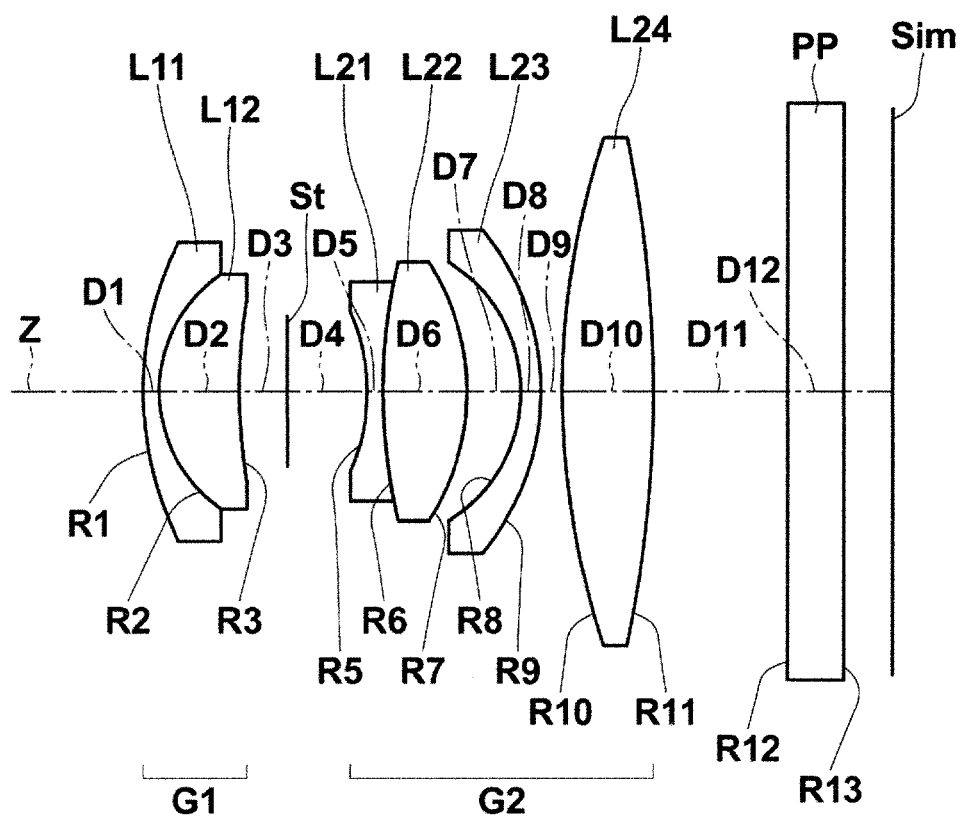
FIG. 2 is a cross section illustrating the lens structure of an imaging lens according to Example 2 of the present invention.

FIG. 2 is a diagram illustrating the arrangement of lens groups in the imaging lens of Example 2. Table 2 shows basic lens data on the imaging lens of Example 2. FIG. 9, Sections A through D are aberration diagrams of the imaging lens of Example 2.

TABLE 2

EXAMPLE 2. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 16.8064 | 0.81 | 1.688931 | 31.07 |
| 2 | 7.1745 | 4.00 | 1.882997 | 40.76 |
| 3 | 28.8045 | 1.69 | | |
| 4 | ∞(STOP) | 4.00 | | |
| 5 | −9.7455 | 0.81 | 1.846660 | 23.78 |
| 6 | 28.7151 | 4.20 | 1.903658 | 31.32 |
| 7 | −12.0227 | 2.70 | | |
| 8 | −7.6415 | 1.00 | 1.622992 | 58.16 |
| 9 | −12.6468 | 1.06 | | |
| 10 | 40.1368 | 4.60 | 1.712995 | 53.87 |
| 11 | −61.2506 | 1.69 | | |
| 12 | ∞ | 2.80 | 1.550000 | 55.00 |
| 13 | ∞ | | | | f = 28.803
FNo. = 2.88

Example 3

Figure 3:
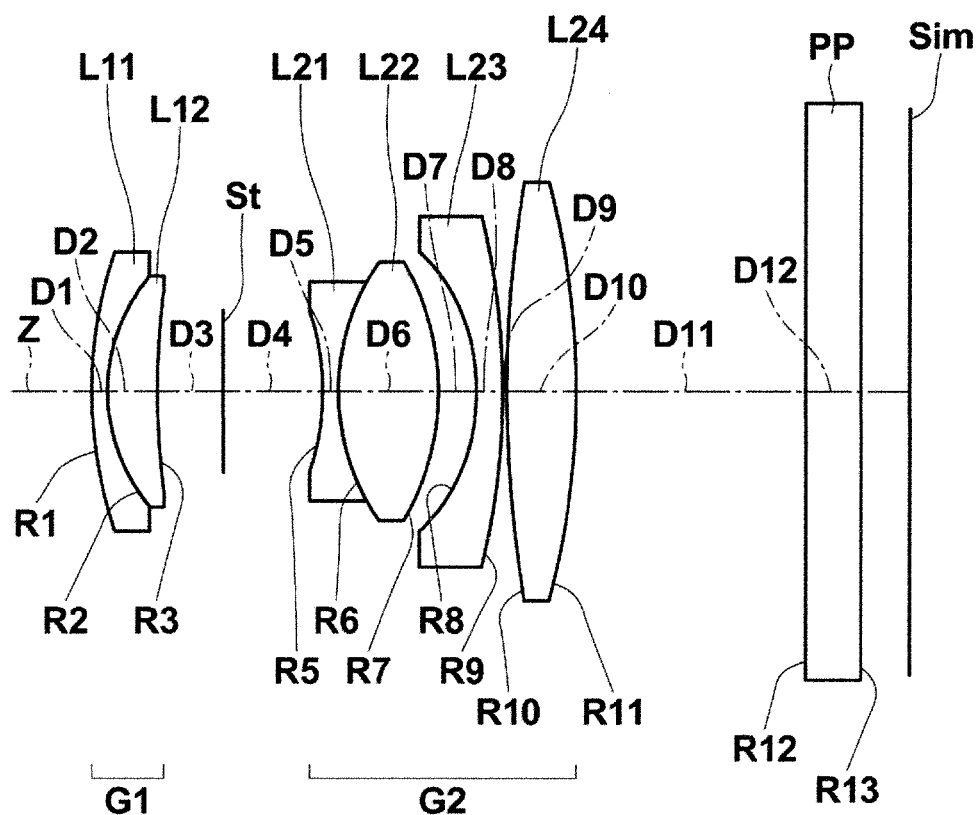
FIG. 3 is a cross section illustrating the lens structure of an imaging lens according to Example 3 of the present invention.

FIG. 3 is a diagram illustrating the arrangement of lens groups in the imaging lens of Example 3. Table 3 shows basic lens data on the imaging lens of Example 3. Further, in the lens data of Table 3, the mark of "*" is attached to the surface number of an aspherical surface, and the numerical value of a paraxial curvature radius is shown, as the curvature radius of the aspherical surface.

Table 4 shows aspherical surface data on the imaging lens of Example 3. Here, the aspherical surface data show the surface number of an aspherical surface and aspherical surface coefficients about the aspherical surface. Here, the numerical value of "E−n" (n: integer) of the aspherical surface coefficient means "×10$^{-n}$". The aspherical surface coefficients are values of coefficients KA, Am (m=3, 4, 5, ... 10) in the following aspherical equation:

$$zd = C \cdot h^2 / \{1 + (1 - KA \cdot C^2 \cdot h^2)^{1/2}\} + \Sigma Am \cdot h^m, \text{ where}$$

Zd: depth of an aspherical surface (the length of a perpendicular from a point on the aspherical surface at height h to a plane that contacts with the vertex of the aspherical surface and is perpendicular to the optical axis), h: height (the length from the optical axis to the lens surface), C: the reciprocal of a paraxial curvature radius, and KA, Am: aspherical surface coefficients (m=3, 4, 5, ... 10).

The description method in Table 4, as described so far, is similar also in Tables 7 and 9, which will be described later.

FIG. 10, Sections A through D are aberration diagrams of the imaging lens of Example 3.

TABLE 3

EXAMPLE 3. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 21.7880 | 0.81 | 1.688931 | 31.07 |
| 2 | 8.9993 | 2.50 | 1.882997 | 40.76 |
| 3 | 39.1376 | 1.61 | | |
| 4 | ∞(STOP) | 5.00 | | |
| 5 | −12.4785 | 0.81 | 1.846660 | 23.78 |
| 6 | 11.4953 | 5.00 | 1.903658 | 31.32 |

TABLE 3-continued

EXAMPLE 3. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 7 | −13.0718 | 1.89 | | |
| *8 | −10.9003 | 1.30 | 1.568645 | 58.62 |
| 9 | −38.0912 | 0.20 | | |
| 10 | 62.4390 | 3.50 | 1.834807 | 42.71 |
| 11 | −40.5262 | 1.61 | | |
| 12 | ∞ | 2.80 | 1.550000 | 55.00 |
| 13 | ∞ | | | |

*ASPHERICAL SURFACE
f = 28.639
FNo. = 2.88

TABLE 4

EXAMPLE 3. ASPHERICAL SURFACE DATA
ASPHERICAL SURFACE COEFFICIENT·S8

| KA | 1.00000000 |
|---|---|
| A3 | −1.78865024E−04 |
| A4 | 2.15879830E−04 |
| A5 | −1.53930984E−04 |
| A6 | 4.43592786E−05 |
| A7 | −6.48183608E−06 |
| A8 | 2.18243207E−07 |
| A9 | 4.72111516E−08 |
| A10 | −4.29988240E−09 |

Example 4

Figure 4:
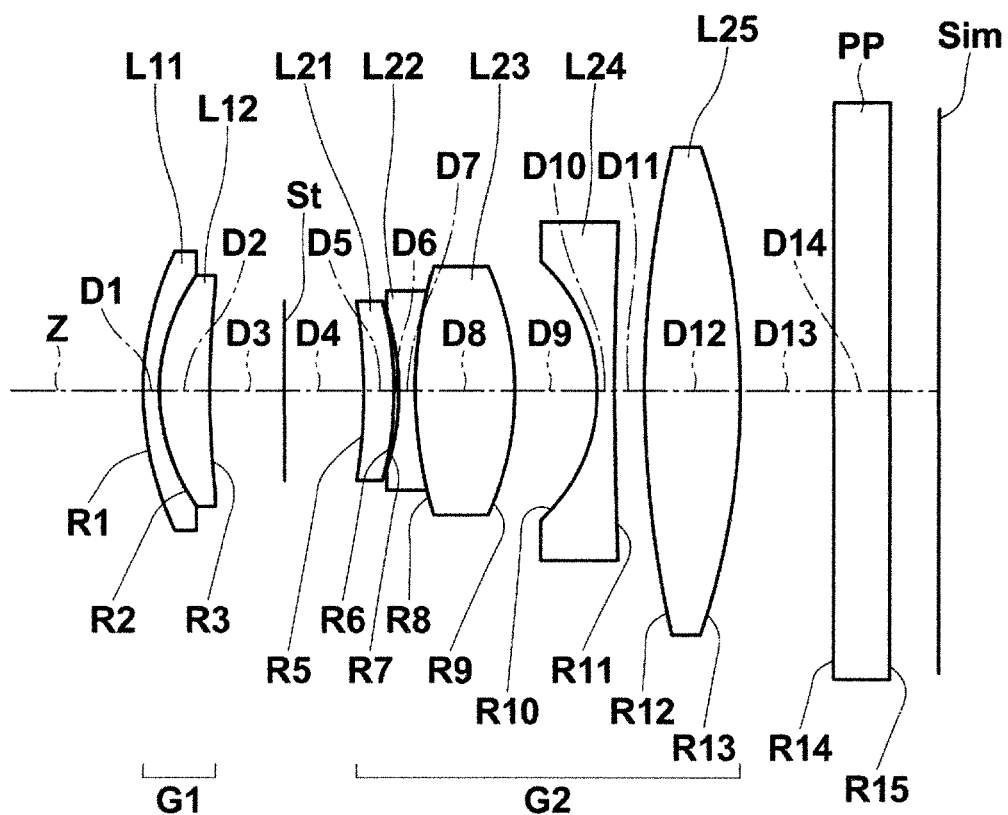
FIG. 4 is a cross section illustrating the lens structure of an imaging lens according to Example 4 of the present invention.

FIG. 4 is a diagram illustrating the arrangement of lens groups in the imaging lens of Example 4. The imaging lens of Example 4 is structured substantially in a similar manner to the imaging lens of Example 1. However, the imaging lens of Example 4 differs from the imaging lens of Example 1 in that second lens group G2 substantially consists of five lenses of 2-1st lens L21, which is a positive lens having a meniscus shape with its convex surface facing the image side, 2-2nd lens L22 having biconcave shape, 2-3rd lens L23 having biconvex shape, and which is cemented on 2-2nd lens L22, 2-4-th lens L24 with negative refractive power, and having a meniscus shape with its convex surface facing the image side, and 2-5-th lens L25 having biconvex shape in this order from the object side. This difference from Example 1 is similar also for Example 7. Therefore, the difference will not be repeated in the descriptions of Example 7. Table 5 shows basic lens data on the imaging lens of Example 4. FIG. 11, Sections A through D are aberration diagrams of the imaging lens of Example 4.

TABLE 5

EXAMPLE 4. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 16.5072 | 0.81 | 1.672700 | 32.10 |
| 2 | 10.0000 | 2.50 | 1.772499 | 49.60 |
| 3 | 49.8907 | 1.68 | | |
| 4 | ∞(STOP) | 4.00 | | |
| 5 | −27.7336 | 1.50 | 1.903658 | 31.32 |
| 6 | −17.7740 | 0.25 | | |

TABLE 5-continued

EXAMPLE 4. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 7 | −12.8682 | 0.81 | 1.688931 | 31.07 |
| 8 | 21.5454 | 5.00 | 1.712995 | 53.87 |
| 9 | −15.0497 | 4.16 | | |
| 10 | −8.8794 | 0.85 | 1.516330 | 64.14 |
| 11 | 203.0472 | 1.48 | | |
| 12 | 55.4382 | 4.80 | 1.882997 | 40.76 |
| 13 | −38.7212 | 1.68 | | |
| 14 | ∞ | 2.80 | 1.550000 | 55.00 |
| 15 | ∞ | | | | f = 32.740
FNo. = 2.92

Example 5

Figure 5:
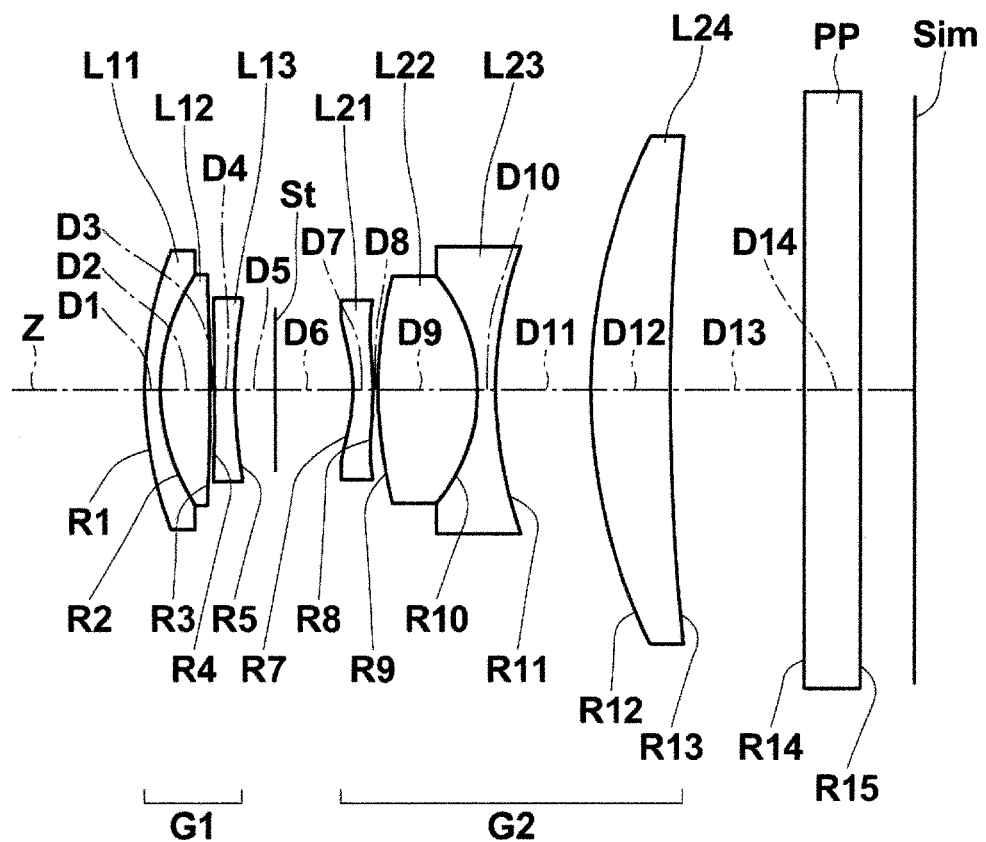
FIG. 5 is a cross section illustrating the lens structure of an imaging lens according to Example 5 of the present invention.

FIG. 5 is a diagram illustrating the arrangement of lens groups in the imaging lens of Example 5. The imaging lens of Example 5 is structured substantially in a similar manner to the imaging lens of Example 1. However, the imaging lens of Example 5 differs from the imaging lens of Example 1 in that first lens group G1 substantially consists of three lenses of 1-1st lens L11, which is a negative lens having a meniscus shape with its convex surface facing the object side, 1-2nd lens L12, which is a positive lens cemented on 1-1st lens L11, and 1-3rd lens L13, which is a negative lens, in this order from the object side, and in that second lens group G2 substantially consists of 2-1st lens L21, which is a positive lens having a meniscus shape with its convex surface facing the image side, and the object-side surface and the image-side surface of which are aspherical surfaces, 2-2nd lens L22 having biconvex shape, 2-3rd lens L23 having biconcave shape, and which is cemented on 2-2nd lens L22, and 2-4-th lens L24, which is a positive lens having a meniscus shape with its convex surface facing the object side in this order from the object side. The difference about second lens group G2 of these differences from Example 1 is similar also for Example 7 except the difference that 2-1st lens L21 is an aspheric lens. Therefore, the difference will not be repeated in the descriptions of Example 7.

Table 6 shows basic lens data on the imaging lens of Example 5. Table 7 shows aspherical surface data on the imaging lens of Example 5. FIG. 12, Sections A through D are aberration diagrams of the imaging lens of Example 5.

TABLE 6

EXAMPLE 5. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 18.9269 | 0.81 | 1.688931 | 31.07 |
| 2 | 10.4998 | 2.50 | 1.882997 | 40.76 |
| 3 | −133.8478 | 0.25 | | |
| 4 | −147.7426 | 1.00 | 1.763580 | 26.82 |
| 5 | 27.4741 | 2.00 | | |
| 6 | ∞(STOP) | 3.89 | | |
| *7 | −7.0426 | 1.00 | 1.568645 | 58.62 |
| *8 | −14.4873 | 0.25 | | |
| 9 | 22.1682 | 5.00 | 1.834807 | 42.71 |
| 10 | −8.8938 | 0.91 | 1.672700 | 32.10 |
| 11 | 21.5613 | 4.76 | | |

TABLE 6-continued

EXAMPLE 5. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 12 | 28.8515 | 4.00 | 1.882997 | 40.76 |
| 13 | 120.6043 | 1.93 | | |
| 14 | ∞ | 2.80 | 1.550000 | 55.00 |
| 15 | ∞ | | | |

*ASPHERICAL SURFACE
f = 28.693
FNo. = 2.88

TABLE 7

EXAMPLE 5. ASPHERICAL SURFACE DATA

ASPHERICAL SURFACE COEFFICIENT•S7

| KA | 1.00000000 |
|---|---|
| A3 | −1.19157374E−03 |
| A4 | 3.78728985E−03 |
| A5 | −3.37549342E−04 |
| A6 | 3.00617613E−04 |
| A7 | −2.33435259E−04 |
| A8 | 7.04574327E−05 |
| A9 | −9.84922018E−06 |
| A10 | 5.39515667E−07 |

ASPHERICAL SURFACE COEFFICIENT•S8

| KA | 1.00000000 |
|---|---|
| A3 | −1.34085883E−03 |
| A4 | 3.84870087E−03 |
| A5 | −7.96153013E−04 |
| A6 | 3.30824056E−04 |
| A7 | −8.70303055E−05 |
| A8 | −1.18503673E−06 |
| A9 | 3.54416290E−06 |
| A10 | −3.72453421E−07 |

Example 6

Figure 6:
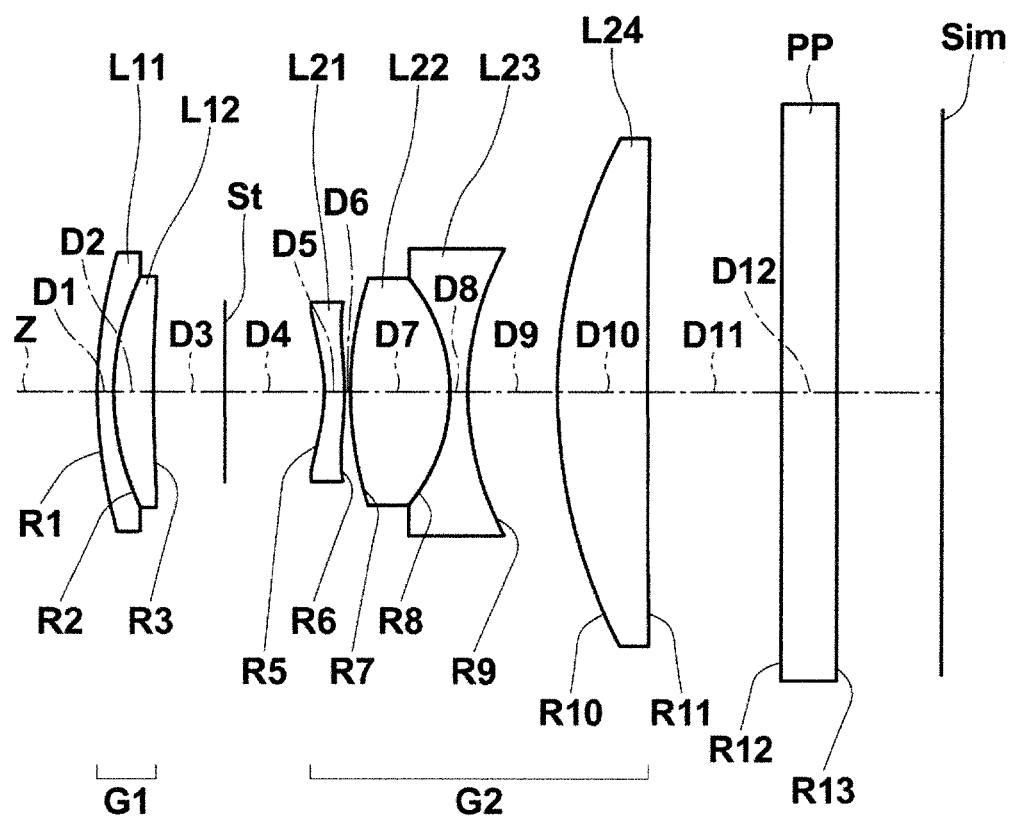
FIG. 6 is a cross section illustrating the lens structure of an imaging lens according to Example 6 of the present invention.

FIG. 6 is a diagram illustrating the arrangement of lens groups in the imaging lens of Example 6. Table 8 shows basic lens data on the imaging lens of Example 6. Table 9 shows aspherical surface data on the imaging lens of Example 6. FIG. 13, Sections A through D are aberration diagrams of the imaging lens of Example 6.

TABLE 8

EXAMPLE 6. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 25.5040 | 0.81 | 1.805181 | 25.42 |
| 2 | 13.2058 | 2.00 | 1.882997 | 40.76 |
| 3 | 82.1501 | 4.47 | | |
| 4 | ∞(STOP) | 5.00 | | |
| *5 | −7.2462 | 1.00 | 1.568645 | 58.62 |
| *6 | −13.9584 | 0.30 | | |
| 7 | 18.8656 | 5.00 | 1.834807 | 42.71 |
| 8 | −8.8250 | 0.91 | 1.672700 | 32.10 |
| 9 | 15.1848 | 4.47 | | |
| 10 | 27.7050 | 4.50 | 1.785896 | 44.20 |
| 11 | 1162.9750 | 4.47 | | |
| 12 | ∞ | 2.80 | 1.550000 | 55.00 |
| 13 | ∞ | | | |

*ASPHERICAL SURFACE
f = 30.509
FNo. = 3.03

TABLE 9

EXAMPLE 6. ASPHERICAL SURFACE DATA

ASPHERICAL SURFACE COEFFICIENT•S5

| KA | 1 |
|---|---|
| A3 | −1.01722311E−03 |
| A4 | 3.49527978E−03 |
| A5 | −5.02798061E−04 |
| A6 | 3.93094113E−04 |
| A7 | −2.44874659E−04 |
| A8 | 7.36672093E−05 |
| A9 | −1.13424045E−05 |
| A10 | 7.25944911E−07 |

ASPHERICAL SURFACE COEFFICIENT•S6

| KA | 1 |
|---|---|
| A3 | −1.39140889E−03 |
| A4 | 3.86956389E−03 |
| A5 | −1.04212221E−03 |
| A6 | 3.90347725E−04 |
| A7 | −7.95670137E−05 |
| A8 | −1.92129967E−06 |
| A9 | 2.67550514E−06 |
| A10 | −2.47095296E−07 |

Example 7

Figure 7:
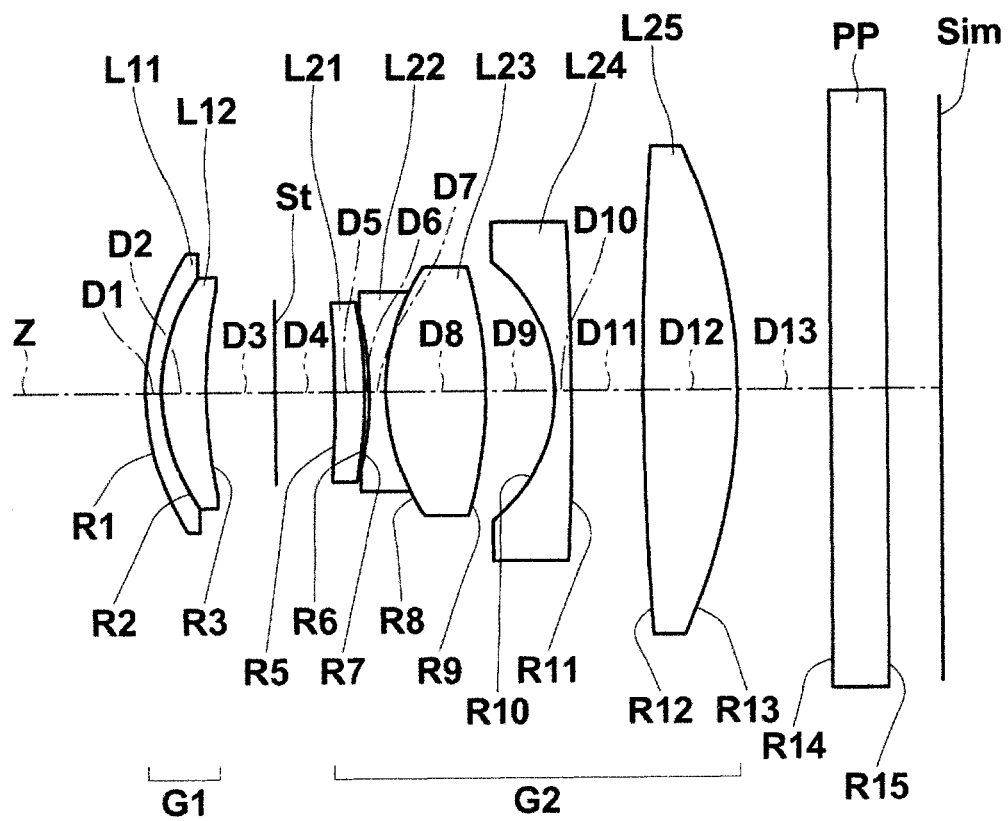
FIG. 7 is a cross section illustrating the lens structure of an imaging lens according to Example 7 of the present invention.
Figure 14:
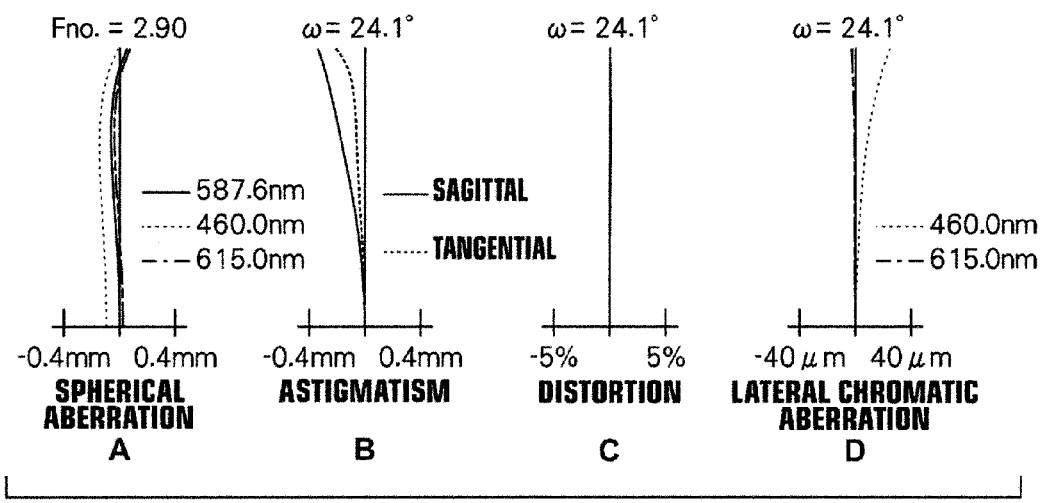
FIG. 14, Sections A through D are aberration diagrams of the imaging lens according to Example 7 of the present invention.

FIG. 7 is a diagram illustrating the arrangement of lens groups in the imaging lens of Example 7. Table 10 shows basic lens data on the imaging lens of Example 7. FIG. 14, Sections A through D are aberration diagrams of the imaging lens of Example 7.

TABLE 10

EXAMPLE 7. BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 12.9491 | 0.81 | 1.749505 | 35.33 |
| 2 | 10.0000 | 2.20 | 1.772499 | 49.60 |
| 3 | 25.4801 | 1.95 | | |
| 4 | ∞(STOP) | 3.00 | | |
| 5 | −59.3926 | 1.50 | 1.903658 | 31.32 |
| 6 | −24.0753 | 0.25 | | |
| 7 | −16.4492 | 0.81 | 1.688931 | 31.07 |
| 8 | 11.2504 | 5.00 | 1.772499 | 49.60 |
| 9 | −21.8817 | 3.49 | | |
| 10 | −8.2501 | 0.85 | 1.516330 | 64.14 |
| 11 | −178.7592 | 3.56 | | |
| 12 | 165.1353 | 4.71 | 1.882997 | 40.76 |
| 13 | −29.0021 | 1.95 | | |
| 14 | ∞ | 2.80 | 1.550000 | 55.00 |
| 15 | ∞ | 0.81 | | | f = 32.756
FNo. = 2.90

Further, Table 11 shows conditions defined by the aforementioned conditional formulas (1) through (8), in other words, values of the literal parts of the expressions for each of Examples 1 through 7. Table 11 shows values for d-line. As Table 11 shows, all of the imaging lenses of Examples 1 through 7 satisfy all of conditional formulas (1) through (8). Further, they satisfy all of conditional formulas (1-1) through (3-1) and (5-1) through (8-1), which define more desirable ranges than the ranges defined by conditional formulas (1) through (8). Therefore, effects as described already in detail are achievable.

TABLE 11

| VALUES ABOUT CONDITIONAL FORMULAS | | | | | | | |
|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 |
| (1)NdfL | 1.69 | 1.69 | 1.69 | 1.67 | 1.69 | 1.81 | 1.75 |
| (2)ν dfL | 31.1 | 31.1 | 31.1 | 32.1 | 31.1 | 25.4 | 35.3 |
| (3)ν d2p − ν d2n | 10.4 | 7.5 | 7.5 | 22.8 | 10.6 | 10.6 | 18.5 |
| (4)NdrL | 1.90 | 1.71 | 1.83 | 1.88 | 1.88 | 1.79 | 1.88 |
| (5)Nd2p − Nd2n | −0.02 | 0.06 | 0.06 | 0.02 | 0.16 | 0.16 | 0.08 |
| (6)f/f2c | 0.68 | 0.21 | 0.57 | 0.11 | 0.77 | 0.70 | 0.16 |
| (7)f/f2 | 0.10 | 0.27 | 0.52 | 0.05 | 0.38 | 0.46 | 0.30 |
| (8)TL/Y | 2.57 | 2.58 | 2.82 | 2.75 | 2.56 | 2.91 | 2.64 |

FIG. 1 illustrates a case in which optical member PP is arranged between a lens system and image formation plane Sim. Instead of arranging there various filters, such as a low-pass filter and a filter that cuts a specific wavelength band, or the like, these various filters may be arranged between lenses. Alternatively, a coating having an action similar to that of various filters may be applied to a lens surface of one of the lenses.

Figure 15:
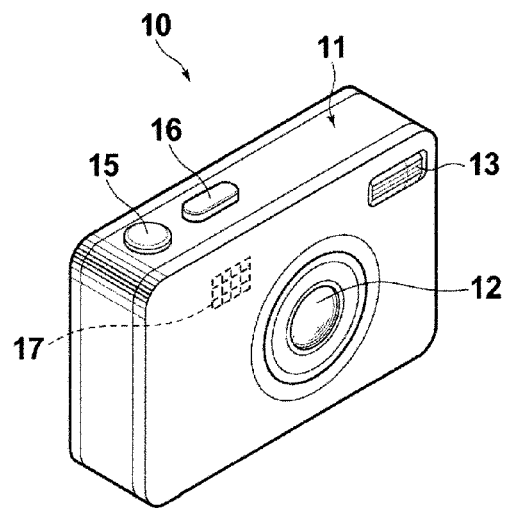
FIG. 15 is a schematic diagram illustrating the configuration of an imaging apparatus according to an embodiment of the present invention.

Next, an imaging apparatus according to the present invention will be described. FIG. 15 is a perspective view illustrating the shape of a camera according to an embodiment of the present invention. A camera 10, which is illustrated here, is a compact digital camera. A small-size imaging lens 12 according to an embodiment of the present invention is provided on the front surface and in the inside of a camera body 11. A flash output device 13 for outputting flash to a subject is provided on the front surface of the camera body 11. A shutter button 15 and a power source button 16 are provided on the upper surface of the camera body 11, and an imaging device 17 is provided in the inside of the camera body 11. The imaging device 17 images an optical image formed by the small-size imaging lens 12, and converts the optical image into electrical signals. For example, the imaging device 17 is composed of a CCD, a CMOS or the like.

As described above, the size of the imaging lens 12 according to the embodiment of the present invention is sufficiently reduced. Therefore, even if a collapsible mount type camera is not adopted as the camera 10, it is possible to make the camera 10 compact both when the camera 10 is being carried and when photography is performed. Further, when a collapsible mount type camera is adopted, it is possible to reduce the size of the camera even more and to improve the portability, compared with conventional collapsible mount type cameras. Further, the camera 10 to which the imaging lens 12 according to the present invention has been applied can perform photography with high image qualities.

Figure 16A:
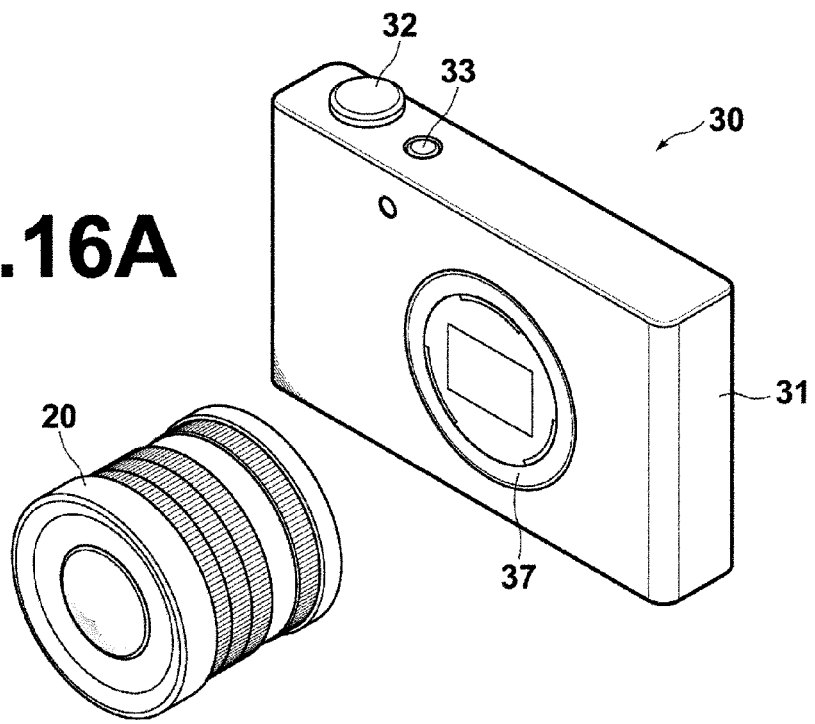
FIG. 16A is a schematic diagram illustrating the configuration of an imaging apparatus according to another embodiment of the present invention.
Figure 16B:
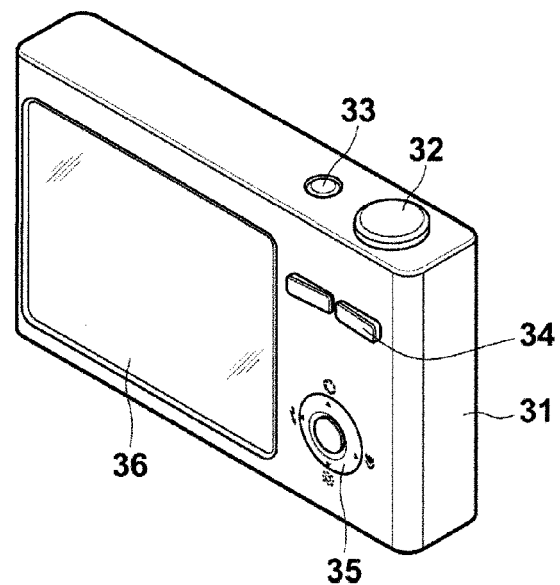
FIG. 16B is a schematic diagram illustrating the configuration of the imaging apparatus according to the other embodiment of the present invention.

Next, an imaging apparatus according to another embodiment of the present invention will be described with reference to FIGS. 16A and 16B. A camera 30, the shape of which is illustrated here in a perspective view, is a so-called mirrorless single-lens type digital still camera, on which an interchangeable lens 20 is detachably mountable. FIG. 16A is an external view of the camera 30 viewed from the front side, and FIG. 16B is an external view of the camera 30 viewed from the back side.

This camera 30 includes a camera body 31, and a shutter button 32 and a power source button 33 are provided on the upper surface of the camera body 31. Further, operation units 34 and 35 and a display unit 36 are provided on the back surface of the camera body 31. The display unit 36 is provided to display an image obtained by imaging and an image that is present within an angle of view before imaging.

An opening for photography, through which light from a target of photography enters, is provided at a central part of the front surface of the camera body 31. Further, a mount 37 is provided at a position corresponding to the opening for photography, and the interchangeable lens 20 is mountable on the camera body 31 by the mount 37. The interchangeable lens 20 is the imaging lens of the present invention housed in a lens barrel.

Further, an imaging device (not illustrated), such as a CCD, which receives an image of a subject formed by the interchangeable lens 20 and outputs imaging signals based on the image, a signal processing circuit for generating an image by processing the imaging signals output from the imaging device, a recording medium for recording the generated image and the like are provided in the camera body 31. This camera 30 performs photography of a still image for one frame each time when the shutter button 32 is pressed. Image data obtained by this photography are recorded in the recording medium.

When the imaging lens according to the present invention is adopted as the interchangeable lens 20 used in such a mirrorless single-lens camera 30, the size of the camera 30 with the lens mounted thereon is sufficiently small. Further, photography with high image qualities is possible.

So far, the present invention has been described by using embodiments and examples. However, the present invention is not limited to the embodiments nor to the examples, and various modifications are possible. For example, values of a curvature radius, a surface distance, a refractive index, an Abbe number, aspherical surface coefficients and the like of each lens element are not limited to the values in the numerical value examples, but may be other values.

What is claimed is:

1. An imaging lens substantially consisting of:
   a first lens group;
   a stop; and
   a second lens group in this order from an object side,
   wherein the first lens group substantially consists of three or less lenses including a negative lens arranged closest to the object side and a positive lens arranged on an image side of the negative lens, and
   wherein the first lens group includes a negative lens having a meniscus shape with its convex surface facing the object side and a positive lens cemented on the negative lens in this order from the object side, and
   wherein the second lens group substantially consists of five or less lenses including a cemented lens composed of two lenses of a positive lens and a negative lens cemented together and a single lens having positive refractive power, and which is arranged on the image side of the cemented lens, and wherein the following conditional formulas (1) through (4) are satisfied:

$$NdfL > 1.65 \quad (1);$$

$$20 < vdfL < 40 \quad (2);$$

$$4 < vd2p - vd2n < 25 \quad (3); \text{ and}$$

$$NdrL > 1.7 \quad (4), \text{ where}$$

NdfL: a refractive index of the negative lens in the first lens group for d-line,
vdfL: an Abbe number of the negative lens in the first lens group for d-line,
vd2p: an Abbe number of the positive lens constituting the cemented lens in the second lens group for d-line,
vd2n: an Abbe number of the negative lens constituting the cemented lens in the second lens group for d-line, and
NdrL: a refractive index of the single lens constituting the second lens group for d-line.

2. The imaging lens, as defined in claim 1, wherein at least one of the following conditional formulas (1-1), (2-1) and (3-1) is satisfied:

$$NdfL > 1.66 \quad (1\text{-}1);$$

$$23 < vdfL < 38 \quad (2\text{-}1); \text{ and}$$

$$6 < vd2p - vd2n < 24 \quad (3\text{-}1).$$

3. The imaging lens, as defined in claim 1, wherein the first lens group has positive refractive power.

4. The imaging lens, as defined in claim 1, wherein the second lens group substantially consists of four lenses of a single lens having positive refractive power, and which is arranged closest to the image side, a cemented lens composed of two lenses, and which is arranged on the object side of the single lens, and a single lens.

5. An imaging apparatus comprising:
the imaging lens, as defined in claim 1.

6. The imaging lens, as defined in claim 1, wherein the following conditional formula (5) is satisfied:

$$-0.05 < Nd2p - Nd2n < 0.20 \quad (5), \text{ where}$$

Nd2p: a refractive index of the positive lens constituting the cemented lens in the second lens group for d-line, and
Nd2n: a refractive index of the negative lens constituting the cemented lens in the second lens group for d-line.

7. The imaging lens, as defined in claim 6, wherein the following conditional formula (5-1) is satisfied:

$$-0.03 < Nd2p - Nd2n < 0.18 \quad (5\text{-}1).$$

8. The imaging lens, as defined in claim 1, wherein the following conditional formula (6) is satisfied:

$$0.05 < f/f2c < 0.90 \quad (6), \text{ where}$$

f2c: a focal length of the cemented lens in the second lens group, and
f: a focal length of an entire system.

9. The imaging lens, as defined in claim 8, wherein the following conditional formula (6-1) is satisfied:

$$0.08 < f/f2c < 0.85 \quad (6\text{-}1).$$

10. The imaging lens, as defined in claim 1, wherein the following conditional formula (7) is satisfied:

$$0 < f/f2 < 0.6 \quad (7), \text{ where}$$

f2: a focal length of the second lens group, and
f: a focal length of an entire system.

11. The imaging lens, as defined in claim 10, wherein the following conditional formula (7-1) is satisfied:

$$0.02 < f/f2 < 0.58 \quad (7\text{-}1).$$

12. The imaging lens, as defined in claim 1, wherein the following conditional formula (8) is satisfied:

$$2.2 < TL/Y < 3.2 \quad (8), \text{ where}$$

TL: a distance on an optical axis from a most-object-side lens surface in an entire system to an image plane when a back focus portion is a distance in air, and
Y: a maximum image height.

13. The imaging lens, as defined in claim 12, wherein the following conditional formula (8-1) is satisfied:

$$2.3 < TL/Y < 3.1 \quad (8\text{-}1).$$

14. The imaging lens, as defined in claim 1, wherein the second lens group includes at least one aspheric lens having at least one aspherical surface.

15. The imaging lens, as defined in claim 14,
wherein a single lens having positive refractive power, and the two surfaces of which are spherical, is arranged closest to the image side in the second lens group, and
wherein the aspheric lens is arranged on the object side of the single lens having positive refractive power.

16. The imaging lens, as defined in claim 14, wherein all lenses in an entire system except the aspheric lens are spherical lenses.

* * * * *